US012789030B2

(12) United States Patent
Takatsuka et al.

(10) Patent No.: US 12,789,030 B2
(45) Date of Patent: Nov. 10, 2026

(54) FIRE EXTINGUISHING AND FIRE SPREAD PREVENTING AGENT COMPOSITION AND FIRE EXTINGUISHING AND FIRE SPREAD PREVENTING AGENT INCLUDING THE SAME

(71) Applicant: YAMATO PROTEC CORPORATION, Tokyo (JP)

(72) Inventors: Yuki Takatsuka, Inashiki-gun (JP); Tatsuki Endo, Inashiki-gun (JP); Takeshi Takayama, Inashiki-gun (JP)

(73) Assignee: YAMATO PROTEC CORPORATION, Tokyo (JP)

( * ) Notice: Subject to any disclaimer, the term of this patent is extended or adjusted under 35 U.S.C. 154(b) by 0 days.

(21) Appl. No.: 17/910,626

(22) PCT Filed: Feb. 3, 2021

(86) PCT No.: PCT/JP2021/003955
§ 371 (c)(1),
(2) Date: Sep. 9, 2022

(87) PCT Pub. No.: WO2021/181957
PCT Pub. Date: Sep. 16, 2021

(65) Prior Publication Data
US 2023/0128375 A1 Apr. 27, 2023

(30) Foreign Application Priority Data
Mar. 13, 2020 (JP) ................................ 2020-044278

(51) Int. Cl.
*A62D 3/02* (2007.01)
*A62C 3/02* (2006.01)
*A62D 1/00* (2006.01)

(52) U.S. Cl.
CPC ................ *A62D 1/005* (2013.01); *A62C 3/02* (2013.01)

(58) Field of Classification Search
None
See application file for complete search history.

(56) References Cited

U.S. PATENT DOCUMENTS

| | | | | |
|---|---|---|---|---|
| 5,091,097 | A | 2/1992 | Pennartz | |
| 2011/0073795 | A1* | 3/2011 | Thomas | A62D 1/0035 252/2 |
| 2014/0138105 | A1* | 5/2014 | Kuwatch | A62D 1/0042 252/2 |
| 2017/0216638 | A1 | 8/2017 | Asayama et al. | |

FOREIGN PATENT DOCUMENTS

| | | | | |
|---|---|---|---|---|
| CN | 104524736 | A * | 4/2015 | A62D 1/0042 |
| FR | 2102933 | A5 * | 4/1972 | |
| JP | 48-87699 | A | 11/1973 | |
| JP | 55-58175 | A | 4/1980 | |
| JP | 8-257157 | A | 10/1996 | |
| JP | 2019-201920 | A | 11/2019 | |
| KR | 20170037417 | A * | 4/2017 | A62D 1/00 |
| WO | 2015/129767 | A1 | 9/2015 | |
| WO | 2018/123311 | A1 | 7/2018 | |
| WO | WO-2018124968 | A1 * | 7/2018 | A62D 1/0042 |

OTHER PUBLICATIONS

International Search Report dated Apr. 20, 2021, issued in counterpart International Application No. PCT/JP2021/003955 (3 pages).

* cited by examiner

*Primary Examiner* — Tanisha Diggs
(74) *Attorney, Agent, or Firm* — WHDA, LLP

(57) ABSTRACT

The present invention provides a composition of a fire extinguishing and fire-spread preventing agent that reduces a burden on the environment and is suitable for extinguishment and fire-spread prevention (re-ignition prevention) of large-scale fire(s), such as a forest fire, and a fire extinguishing and fire-spread preventing agent using this composition. The composition of a fire extinguishing and fire-spread preventing agent and the fire extinguishing and fire-spread preventing agent relating to the present invention are characterized by containing salt of phosphorus, potassium salt and a dispersion medium.

4 Claims, No Drawings

FIRE EXTINGUISHING AND FIRE SPREAD PREVENTING AGENT COMPOSITION AND FIRE EXTINGUISHING AND FIRE SPREAD PREVENTING AGENT INCLUDING THE SAME

TECHNICAL FIELD

The present invention relates to a composition of a fire extinguishing and fire-spread preventing agent that is suitable for extinguishment and fire-spread prevention of a large-scale fire(s), such as forest fires, and a fire extinguishing and fire-spread preventing agent containing this.

BACKGROUND TECHNOLOGY

Issues, such as dry land having expanded in warm regions in association with current global warming, a frequency of forest fires having become risen and a fire scale becoming expanded, have become apparent, and technologies regarding extinguishment and fire-spread prevention against a large-scale fire(s), such as forest fires, on a worldwide scale are in demand.

As conventionally known typical extinguishing agents, water, powdery extinguishing agents, alkali salt in water, foam extinguishing agents and the like are exemplified.

Water is the most frequently used as an inexpensive extinguishing agent; however, even though burning objects (extinguishment targets) are once extinguished with water, they are likely to be reignited after evaporation of the water, and the powdery extinguishing agents containing an ammonia component prevent a chain reaction of burning by an ammonia radical generated due to decomposition by heat and demonstrate their ability to fight the fires, but they may pose an obstacle to fire extinguishment and fire-spread prevention depending upon a direction of the wind.

Further, in addition to an effect A to extinguish fires, the alkali salt in water has another effect B to saponify oil with fires and to put out the fires, but the alkali salt in water becomes dried and powderized on surfaces of the extinguished burned objects (extinguishment targets), and the re-ignition cannot be always prevented, and the foam extinguishing agent demonstrates its extinguishment ability with a cooling effect due to vaporization heat of water and an asphyxiating effect of foam on the surface of the burning materials (extinguishment targets), but because it contains a surfactant(s), an influence on the environment is in dispute.

In the meantime, for example in Patent Literature 1 (Japanese Patent Application Laid-Open No. 2019-201920), "A temperature-susceptible inorganic composition extinguishing agent for metallic fires or a temperature-susceptible inorganic composition fire-spread preventing agent for metallic fires, containing an alkali metal silicate compound, 0 to 26 parts by weight of aluminum silicate based upon 100 parts by weight of a solid content of silicon dioxide of the alkali metal silicate compound, and water" is proposed.

PRIOR ART DOCUMENT

Patent Literature

[Patent Literature 1] Japanese Patent Application Laid-Open No. 2019-201920

SUMMARY OF THE INVENTION

Problem to be Solved by the Invention

However, the inorganic composition fire-spread, preventing agent described in Patent Literature 1 above is dedicated to metallic fires, and this is not always suitable for extinguishment and fire-spread prevention of large-scale fire(s), such as forest fires, from a viewpoint of a burden of materials to be used on the environment.

Then, the objective of the present invention is to provide a composition of fire extinguishing and fire-spread preventing agent that reduces a burden on the environment, and that is suitable for large-scale fire(s), such as a forest fire, and a fire extinguishing and fire-spread preventing agent using this composition.

Means for Solving the Problem

In order to accomplish the objective above, as a result of keenly repeating experiments to study components of the fire extinguishing agent and its formulation, the present inventors discovered that adjustment of a combination of phosphate and potassium salt within a specific range of a compounding ratio would be effective for realization of a composition of a fire extinguishing and fire-spread preventing agent that reduces a burden on the environment, and that would be suitable for fire extinguishment and fire-spread prevention (prevention of re-ignition) against large-scale fire(s), such as forest fires, and they accomplished the present invention.

In other words, the present invention relates to a composition of a fire extinguishing and fire-spread preventing agent containing salt of phosphorus, potassium salt and a dispersion medium.

Further, in the composition of a fire extinguishing and fire-spread preventing agent having the constitution above, it is preferable that the salt of phosphorus contains monobasic ammonium phosphate and dibasic ammonium phosphate, and that the potassium salt is a compound that generates a potassium radical due to thermal energy. Further, it is preferable that the dispersing agent contains water.

Further, in the composition of a fire extinguishing and fire-spread preventing agent having the constitution above, it is preferable to contain 5 to 50% by mass of the salt of phosphorus and 0.1 to 20% by mass of the potassium salt. Furthermore, the remnant should be a dispersion medium and any other additive(s). Needless to say, a total of all components of the composition of a fire extinguishing and fire-spread preventing agent should be 100% by mass.

In addition, the present invention also relates to a fire extinguishing and fire-spread preventing agent includes the composition of a fire extinguishing and fire-spread preventing agent of the present invention, and a container that provides accommodation for the composition of an fire extinguishing and fire-spread preventing agent.

In the fire extinguishing and fire-spread preventing agent with the constitution above, the container is preferably made of biodegradable plastics.

Effect of the Invention

According to the present invention, a composition of a fire extinguishing and fire-spread preventing agent that reduces a burden on the environment, and that is suitable for extinguishment and fire-spread prevention (prevention of re-ignition) against large-scale fire(s), such as forest fires, and a fire extinguishing and fire-spread preventing agent using this composition can be realized.

MODE FOR CARRYING OUT THE INVENTION

Hereafter, typical embodiments of the composition of a fire extinguishing and fire-spread preventing agent and the fire extinguishing and fire-spread preventing agent using this composition relating to the present invention will be described in detail. Furthermore, the present invention is not limited only to these, but various variations and the like can be considered within the technical scope of the present invention, and these shall be all included in the invention of the present application.

<Composition of Fire Extinguishing and Fire-Spread Preventing Agent>

The composition of a fire extinguishing and fire-spread preventing agent relating to the present invention is characterized by mainly containing (A) salt of phosphorus, (B) potassium salt and (C) a dispersion medium. Hereafter, these components will be explained.

(A) Salt of Phosphorus

The salt of phosphorus has an effect to prevent re-ignition clue to carbonization of a wood surface. As the salt of phosphorus, for example, ammonium phosphate, such as monobasic ammonium phosphate, dibasic ammonium phosphate or tribasic ammonium phosphate; sodium phosphate, such as monobasic sodium phosphate, bibasic sodium phosphate or tribasic sodium phosphate; potassium phosphate, such as monobasic potassium phosphate, bibasic potassium phosphate or tribasic potassium phosphate; phosphoric acids, guanyl phosphate, urea phosphate, amide phosphoric acid, ester phosphates, dimethyl phosphate and the like are exemplified.

Among them, from a viewpoint of a superior fire-spread preventing effect to coat an object, which is a burning object (extinguishment target), at higher temperatures, ammonium salt of phosphoric acid is preferable, and it is further preferable to concurrently use monobasic ammonium phosphate and dibasic ammonium phosphate.

The greater the content of the salt of phosphorus in the composition of a fire extinguishing and fire-spread preventing agent of the present invention becomes, the higher the effect becomes, and this is preferable, but the content is preferably the greatest quantity to be able to maintain an aqueous solution state from a viewpoint of operatability, diffusability and the like. For example, the content should be 5 to 50% by mass and it is further preferable to be 10 to 40% by mass.

Further, for a mixing ratio in the case of concurrently using monobasic ammonium phosphate and dibasic ammonium phosphate as the salt of phosphorus, the ratio of monobasic ammonium phosphate to dibasic ammonium phosphate should be 1-3 to 1-10 in a mass ratio, and is preferably 1-3 to 2-8.

(B) Potassium Salt

The potassium salt is a compound that generates a potassium radical due to thermal energy, and improves an extinguishing property due to a negative catalyst effect of the potassium radical. As the potassium salt, for example, potassium nitrate, potassium sulfate, potassium hydroxide, potassium acetate, potassium propionate, potassium citrate monobasic, potassium citrate bibasic, potassium citrate tribasic, monopotassium trihydrogen ethylenediaminetetraacetate, dipotassium dihydrogen ethylenediaminetetraacetate, tripotassium monohydrogen ethylenediaminetetraacetate, tetrapotassium ethylenediaminetetraacetate, potassium hydrogen phthalate, dipotassium phthalate, potassium hydrogen oxalate, dipotassium oxalate, potassium bicarbonate and the like are exemplified.

Among them, from a viewpoint of a water-soluble potassium-containing compound that is used for an aerosol extinguishing agent, it is preferable to use potassium bicarbonate or potassium citrate tribasic.

The content of the potassium salt in the composition for a fire extinguishing and fire-spread preventing agent of the present invention should be 0.1 to 20% by mass from a viewpoint where it is desirable to have a greater amount of aerosol generation and solubility, and it is further preferable that the content is 5 to 10% by mass.

(C) Dispersion Medium

The dispersion medium contains (A) salt of phosphorus and (B) potassium salt by dispersing or dissolving, and it also provides a cooling effect. As such dispersion medium, water (all clear liquids generally referred to as water, such as tap water, filtrate water, ion-exchanged water, distilled water or purified water, are included), seawater, river water, lake water, underground water, well water and the like are exemplified.

Among them, water is preferable from viewpoints where it is desirable that greater quantities of the salt of phosphorus and the potassium salt, which are extinguishing components, are dissolvable, and contents of ions, fine particles and the like, are lesser so as not to form a solid or the like. Further, the dispersion medium occupies a remnant other than (A) salt of phosphorus, (B) potassium salt and (D) optional additive component(s) to be described later, in the composition for a fire extinguishing and fire-spread preventing agent of the present invention.

(D) Optional Additive Components

The composition of a fire extinguishing and fire-spread preventing agent of the present invention may contain other optional components within a scope not severely impairing the effect of the present invention. As such optional additive components, for example, salt of alkaline metal or alkaline earth metal other than potassium, borate, nitrate, silicate, sulfate and the like are exemplified. The additive amounts of the optional additive components should be within a scope not severely impairing the effect of the present invention.

<Fire Extinguishing and Fire-Spread Preventing Agent>

Next, the present invention also relates to a fire extinguishing and fire-spread preventing agent that is characterized by including the composition for a fire extinguishing and fire-spread preventing agent of the present invention having the constitution above and a container providing accommodation for the composition of a fire extinguishing and fire-spread preventing agent. This enables injection, drop or the like of the composition of a fire extinguishing and fire-spread preventing agent contained in the container, and it excels in extinguishing workability and operatability.

Here, as the container, any containers that can provide the accommodation for the composition for a fire extinguishing and fire-spread preventing agent of the present invention are usable as needed, but containers made of biodegradable plastics are preferable from a viewpoint of a burden on the environment by taking the situation where the fire extinguishing and fire-spread preventing agent will eventually return to the natural world into consideration.

As such biodegradable plastics, for example, microbial system biodegradable plastics, such as biopolyesters (such as PHB/V), bacterial cellulose, and microbial polysaccharide (such as pullulan or curdlan), chemical synthesis system biodegradable plastics, such as aliphatic polyesters (such as polycaprolactone, polybutylene succinate, polyethylene succinate, polyglycolic acid or polylactic acid), polyvinyl alcohols, polyamino acids (such as PMLG), polyurethanes, and nylon oligomer; natural product system biodegradable plastics, such as chitosan and cellulose; and the like are exemplified.

The form of the container above is not particularly limited as long as it can provide the accommodation of the composition of a fire extinguishing and fire-spread preventing agent of the present invention and it can withstand drop or injection, and various forms, such as saclike, box-like, bottle-like, spherical, tubular and microcapsule-like forms, a form where a chemical has been gelated, a form where a chemical has been impregnated into a porous material, and a form where a chemical has been frozen, are exemplified. Further, the containers can have flexibility or rigidity.

EXAMPLE

In order to evaluate the fire-extinguishing property and the fire-spread preventability of the composition of a fire extinguishing and fire-spread preventing agent of the present invention, various components shown in Table 1 were mixed to prepare compositions of a fire extinguishing and fire-spread preventing agents 1 to 12, and evaluation tests mentioned below were conducted.

[Evaluation Test]

(1) Fire-Extinguishing Property

For each of the compositions for a fire extinguishing and fire-spread preventing agent 1 to 12, their fire-extinguishing properties were determined according to whether or not each composition had the fire-extinguishing property on the occasion of spraying 60-75 L/min·m$^3$ of total spraying quantity for 8 seconds from a height of 10 m using the First Model (A-2) mentioned in the ministry ordinance establishing technical standards of fire extinguishers. Results are shown in Table 1.

(2) Fire-Spread Preventability

For each of the compositions of a fire extinguishing and fire-spread preventing agent 1 to 12, their fire-spread preventability was determined according to whether or not an ember remained after the predetermined fire extinguishment conducted in (1) above and each composition had inflammatory preventability due to re-ignition prevention for two minutes. Results are shown in Table 1.

TABLE 1

| | Components and Contents of Composition (mass %, 100% by mass in which a reminder is water) | | | | | | |
|---|---|---|---|---|---|---|---|
| Composition No. | Monobasic ammonium phosphate | Dibasic ammonium phosphate | Tripotassium citrate | Potassium nitrate | Potassium bicarbonate | Fire extinguishing property | Fire-spread preventability |
| 1 | 5 | 45 | 0.1 | 0 | 0 | Confirmed | Confirmed |
| 2 | 5 | 20 | 5 | 0 | 0 | Confirmed | Confirmed |
| 3 | 5 | 5 | 10 | 0 | 0 | Confirmed | Confirmed |
| 4 | 5 | 2 | 20 | 0 | 0 | Confirmed | Confirmed |
| 5 | 5 | 20 | 0 | 5 | 0 | Confirmed | Confirmed |
| 6 | 5 | 5 | 0 | 10 | 0 | Confirmed | Confirmed |
| 7 | 5 | 20 | 0 | 0 | 5 | Confirmed | Confirmed |
| 8 | 5 | 5 | 0 | 0 | 10 | Confirmed | Confirmed |
| 9 | 0 | 0 | 10 | 0 | 0 | Confirmed | Not confirmed |
| 10 | 0 | 0 | 0 | 10 | 0 | Confirmed | Not confirmed |
| 11 | 0 | 0 | 0 | 0 | 10 | Confirmed | Not confirmed |
| 12 | 0 | 0 | 0 | 0 | 0 | Not confirmed | Not confirmed |

According to the results shown in Table 1, particularly from experimental results of Composition Nos. 1 to 8, it has been ascertained that the fire extinguishing and fire-spread preventing agents of the present invention excel in both the fire extinguishing property and the fire-spread preventability in predetermined blending ratios.

The invention claimed is:

1. A composition of a fire extinguishing and fire-spread preventing agent, consisting of:

monobasic ammonium phosphate;

dibasic ammonium phosphate, wherein a combination of the monobasic ammonium phosphate and the dibasic ammonium phosphate are included in the composition at 7 to 50% by mass;

0.1 to 9% by mass of at least one potassium salt selected from the group consisting of tripotassium citrate, potassium nitrate, potassium bicarbonate and a combination thereof; and water wherein each % by mass is based on a total mass of the composition and the water is a remainder of the composition, and a ratio of the monobasic ammonium phosphate to the dibasic ammonium phosphate is 1:3 to 1:10 in a mass ratio.

2. The composition of a fire extinguishing and fire-spread preventing agent according to claim 1, wherein a total content of the monobasic ammonium phosphate; the dibasic ammonium phosphate, and the at least one potassium salt is up to 50.1% by mass, and a remainder thereof is the water.

3. A fire extinguishing and fire-spread preventing agent, comprising:

the composition of a fire extinguishing and fire-spread preventing agent according to claim 1, and a container that provides accommodation for the composition of the fire extinguishing and fire-spread preventing agent.

4. The fire extinguishing and fire-spread preventing agent according to claim 3, wherein the container is made of biodegradable plastics.

* * * * *